(12) United States Patent
Stewart et al.

(10) Patent No.: US 11,648,971 B2
(45) Date of Patent: May 16, 2023

(54) FOLDABLE GOLF TROLLEY

(71) Applicant: STEWART GOLF LIMITED, Quedgeley (GB)

(72) Inventors: Mark Stewart, Quedgeley (GB); Jon Stewart-Miller, Quedgeley (GB); David Funnell, Quedgeley (GB); Duncan Ross Stewart, Quedgeley (GB)

(73) Assignee: STEWART GOLF LIMITED, Quedgeley (GB)

( * ) Notice: Subject to any disclaimer, the term of this patent is extended or adjusted under 35 U.S.C. 154(b) by 131 days.

(21) Appl. No.: 17/182,620

(22) Filed: Feb. 23, 2021

(65) Prior Publication Data

US 2021/0261181 A1    Aug. 26, 2021

(30) Foreign Application Priority Data

Feb. 24, 2020 (GB) .................................... 2002580

(51) Int. Cl.
*B62B 3/02*        (2006.01)
*B62B 3/10*        (2006.01)
*B62B 5/00*        (2006.01)

(52) U.S. Cl.
CPC .............. *B62B 3/022* (2013.01); *B62B 3/106* (2013.01); *B62B 5/0046* (2013.01); *B62B 2202/404* (2013.01)

(58) Field of Classification Search
CPC ........... B62B 3/022; B62B 3/106; B62B 3/00; B62B 3/10; B62B 5/0046; B62B 5/00; B62B 5/0036; B62B 5/0026; B62B 5/0033; B62B 2205/18; B62B 2205/26;
(Continued)

(56) References Cited

U.S. PATENT DOCUMENTS 5,232,065 A * 8/1993 Cotton .................. B62B 5/0026
                                                280/DIG. 6
7,237,795 B2 * 7/2007 Wu .......................... B62B 3/12
                                                280/DIG. 6
(Continued)

FOREIGN PATENT DOCUMENTS

CN          2912724 Y     6/2007
CN        110882528 A     9/2019
(Continued)

*Primary Examiner* — James M Dolak
(74) *Attorney, Agent, or Firm* — Ward Law Office LLC; Jacob M. Ward

(57) ABSTRACT

A foldable golf trolley comprising a chassis; at least one electrically powered rear drive wheel; a wheel support arm mounted to the front of the chassis supporting a front wheel; a stabilizer arm mounted to the rear of the chassis supporting a stabilizer wheel; a main support mounted to the chassis and a handle mounted to the main support; wherein the main support, the wheel support arm and the stabilizer arm are rotatably mounted to the chassis and movable between an operative configuration and a folded configuration; and gears connecting the stabilizer arm and main support, wherein rotation of the main support between the operative configuration and the folded configuration cause rotation of the stabilizer arm between the operative configuration and the folded configuration.

19 Claims, 5 Drawing Sheets

(58) Field of Classification Search
CPC .......... B62B 2202/404; B62B 2301/08; A63B 55/60; A63B 55/61; A63B 55/00
See application file for complete search history.

(56) References Cited

U.S. PATENT DOCUMENTS

| | | | | |
|---|---|---|---|---|
| 7,293,619 | B2* | 11/2007 | Mitchell, Jr. | B62B 5/0026 |
| | | | | 180/19.2 |
| 8,517,411 | B2* | 8/2013 | Martin | B62B 1/045 |
| | | | | 280/DIG. 6 |
| 8,955,870 | B2* | 2/2015 | Lee | B60L 15/20 |
| | | | | 280/DIG. 6 |
| 9,211,898 | B2* | 12/2015 | Stewart | B62B 3/12 |
| 9,555,822 | B2* | 1/2017 | Rauch | A63B 55/61 |
| 10,016,666 | B2* | 7/2018 | Reimers | B62B 5/0053 |
| 10,213,667 | B2* | 2/2019 | Murabe | B62B 5/0033 |
| 10,322,738 | B1* | 6/2019 | Wu | B62B 5/067 |
| 10,457,308 | B2* | 10/2019 | Liao | A63B 55/60 |
| 10,471,314 | B1* | 11/2019 | Tran | A63B 55/30 |
| 10,562,557 | B2* | 2/2020 | Gong | A63B 55/60 |
| 2007/0063487 | A1 | 3/2007 | Wu | |
| 2009/0038864 | A1* | 2/2009 | Yun | B62B 3/12 |
| | | | | 180/19.1 |
| 2012/0118657 | A1* | 5/2012 | Liao | A63B 55/61 |
| | | | | 180/208 |
| 2013/0234418 | A1* | 9/2013 | Reimers | B62B 3/02 |
| | | | | 280/641 |

FOREIGN PATENT DOCUMENTS

| | | |
|---|---|---|
| DE | 202014104774 U | 1/2015 |
| GB | 2455840 A | 6/2009 |

* cited by examiner

FOLDABLE GOLF TROLLEY

CROSS-REFERENCE TO RELATED APPLICATIONS

This application claims the benefit of Great Britain Application. No. GB2002580.5 filed on Feb. 24, 2020. The entire disclosure of the above application is incorporated herein by reference.

FIELD

The present disclosure relates to a foldable golf trolley, more particularly, to a foldable golf trolley with a powered drive wheel and a rear stabilizer.

INTRODUCTION

This section provides background information related to the present disclosure which is not necessarily prior art.

When using an electric golf trolley on hilly terrain, for best performance and stability, it is usual to provide a rear stabilizer behind the main drive wheels of the trolley. The stabilizer is usually a wheel, which ensures that the trolley does not tip over backwards. If the trolley does tip backwards when going up a hill, then the stabilizer wheel contacts the ground, prevents further tipping of the trolley and allows the trolley to continue in its forward motion. When the ground flattens out, then if the front wheels have lifted off the ground, they return to the ground and the stabilizer wheel is no longer engaged with the ground.

A problem of a stabilizer wheel is that it necessarily protrudes from the rear of the trolley. Also, the wheel needs to project far enough from the rear of the trolley to have the desired effect on stability during a tipping event. This means that the stabilizer wheel makes the trolley larger than is ideal for storage and transit, for example, in a garage or car boot. Given that a stabilizer is vital to the performance of a trolley, it is not desirable to allow a user to remove it for storage, because there is risk that it may not be refitted prior to the next use of the trolley.

A typical golf player in the UK may play golf, for example, around 2 to 3 times per week, for 4 to 5 hours at a time. During this time, their trolley is in use, but for the rest of the time, the trolley is either stored in the boot of a car or in a garage. In other words, a golf trolley spends most of its life not being used, and so having a minimal size of trolley when it is folded and stored is very important to golf players.

It is an object of the present invention to reduce or substantially obviate the aforementioned problems.

SUMMARY

According to the present invention, there is provided a foldable golf trolley comprising a chassis, at least one electrically powered rear drive wheel, a wheel support arm mounted to the front of the chassis supporting a front wheel, a stabilizer arm mounted to the rear of the chassis supporting a stabilizer wheel, a main support mounted to the chassis and a handle mounted to the main support, wherein the main support, the wheel support arm and the stabilizer arm are movably mounted to the chassis and movable between an operative configuration and a folded configuration, and gears connecting the stabilizer arm and main support, wherein movement of the main support between the operative configuration and the folded configuration cause movement of the stabilizer arm between the operative configuration and the folded configuration.

The above foldable golf trolley with retractable stabilizer means reduces the size of the trolley which improves it storability and transportability when not in use. Furthermore, the stabilizer wheel allows the drive wheels to still drive the foldable golf trolley when it is partially tipped, i.e., when the front wheel is no longer in contact with the surface on which the golf trolley is traveling.

Coupling of the stabilizer arm to the main support through the gears provides a means to automatically retract the stabilizer arm into its folded or stowed position and deploy the stabilizer arm into its operative position. This ensures that the user does not accidently forget to attach a removable stabilizing means, the lack of which would allow the golf trolley to tip over entirely causing damage to the trolley and golf clubs.

A movable wheel support arm reduces the overall size of the foldable golf trolley in the folded configuration. The foldable golf trolley is mechanically simplified by providing a movable wheel support arm not coupled to the movement of the main support or stabilizer arm.

The folded configuration can also be referred to as the folded position and the operative configuration can also be referred to as the operative position.

Optional features are present in the dependent claims.

The main support, the wheel support arm and the stabilizer arm may be rotatably mounted to the chassis and rotatable between an operative configuration and a folded configuration. Rotation of the main support between the operative configuration and the folded configuration may cause movement of the stabilizer arm between the operative configuration and the folded configuration.

The main support and stabilizer arm may counter rotate when moved between the operative configuration and the folded configuration. This counter rotation causes one to rotate in one direction while the other rotates in the opposite.

The gears may be integrally formed with the stabilizer arm and the main support.

Gears which are formed in or on the stabilizer arm and main support reduces the mechanical complexity of the foldable golf trolley which improves reliability.

The stabilizer arm may be substantially doglegged in cross section.

The dogleg shaped stabilizer arm allows the stabilizer wheel to be appropriately positioned in both the folded configuration and the operative configuration. For example, in the operative configuration, the stabilizer wheel is in a position so that it only contacts the ground when the foldable golf trolley has tipped by a predetermined angle.

The stabilizer wheel may be disposed, in the operative configuration, outside an area formed by the periphery of the chassis. The stabilizer wheel may be disposed, in the folded configuration, within the area formed by the periphery of the chassis.

Essentially, the areas formed by the periphery of the chassis are defined by the periphery of either the underside or upper side of the chassis when viewed in plan.

The chassis may comprise a first and second stop adapted to limit rotation of the stabilizer arm. The first stop may define the position of the stabilizer arm in the operative configuration. The second stop may define the position of the stabilizer arm in the folded configuration. The first and second stop may be disposed on either side of the axis of rotation of the stabilizer arm.

The foldable golf trolley may comprise a stand disposed on the rear end of the chassis. The stand may be formed by a portion of the chassis and the stabilizer wheel when the stabilizer arm is in a folded configuration. The portion of the chassis forming the stand may be flush with the periphery of the stabilizer wheel, i.e., the surface of the portion of the chassis forming the stand may sit on a plane formed by a tangent of the stabilizer wheel.

By providing a stand disposed on the rear end of the chassis it allows the foldable golf trolley to be stored in a vertical position reducing the floorspace needed.

The handle may be rotatably mounted to the end of the main support. The handle may be moved between an operative configuration and a folded configuration. In the operative configuration the handle may extend from the main support in a rearward direction, and in the folded configuration the handle extends along the main support.

The handle may automatically move the main support between the operative configuration and folded configuration.

The foldable golf trolley comprises a golf bag stand. The golf bag stand may include a golf bag support arm rotatably mounted to the main support. The golf bag stand may include a golf bag support foot disposed on the wheel support arm. The golf bag stand may include a concave receiving space disposed proximate to the golf bag support foot.

The golf bag support arm may automatically move between the operative configuration and folded configuration based on main support and/or handle moving between the operative configurations and folded configurations.

The foldable golf trolley may comprise a latch for releasably securing both the stabilizer arm and main support in their operative configuration.

The latch may comprise a rocker arm disposed on or in the main support and a receiving means disposed in the stabilizer arm for receiving a portion of the rocker arm. The rocker arm may include a hook disposed on one end of the rocker arm. The hook may include a cam surface. The latch may include a biasing means to bias the hook into an engagement position.

The front wheel and the drive wheel may sit on the same plane when the wheel support arm is in the folded configuration.

A tangent to the surface of the front wheel may define a plane which forms a tangent to the surface of the drive wheel when the wheel support arm is in a folded configuration.

The front wheel, drive wheel and stabilizer wheel may sit on the same plane when the stabilizer arm is in the folded configuration.

A tangent to the surface of the stabilizer wheel may define a plane which forms a tangent to the surfaces of the drive wheel and front wheel.

The wheels sitting on the same plane, when in the folded configuration, allows the user to move the foldable golf trolley without having to pick it up and carry it. This limits weight concerns when designing the trolley.

Further areas of applicability will become apparent from the description provided herein. It should be understood that the description and specific examples are intended for purposes of illustration only and are not intended to limit the scope of the present disclosure.

DRAWINGS

For a better understanding of the present invention, and to show more clearly how it may be carried into effect, reference will now be made by way of example only to the accompanying drawings, in which.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom.

Referring to FIGS. 1 to 5, a foldable golf trolley is generally indicated at 10.

The foldable golf trolley 10 includes a chassis 12. The chassis 12 has a first end which, in use, is proximate the front of the foldable golf trolley 10 and a second end which, in use, is proximate the rear of the foldable golf trolley 10. The chassis has an upper side and an underside.

Figure 1:
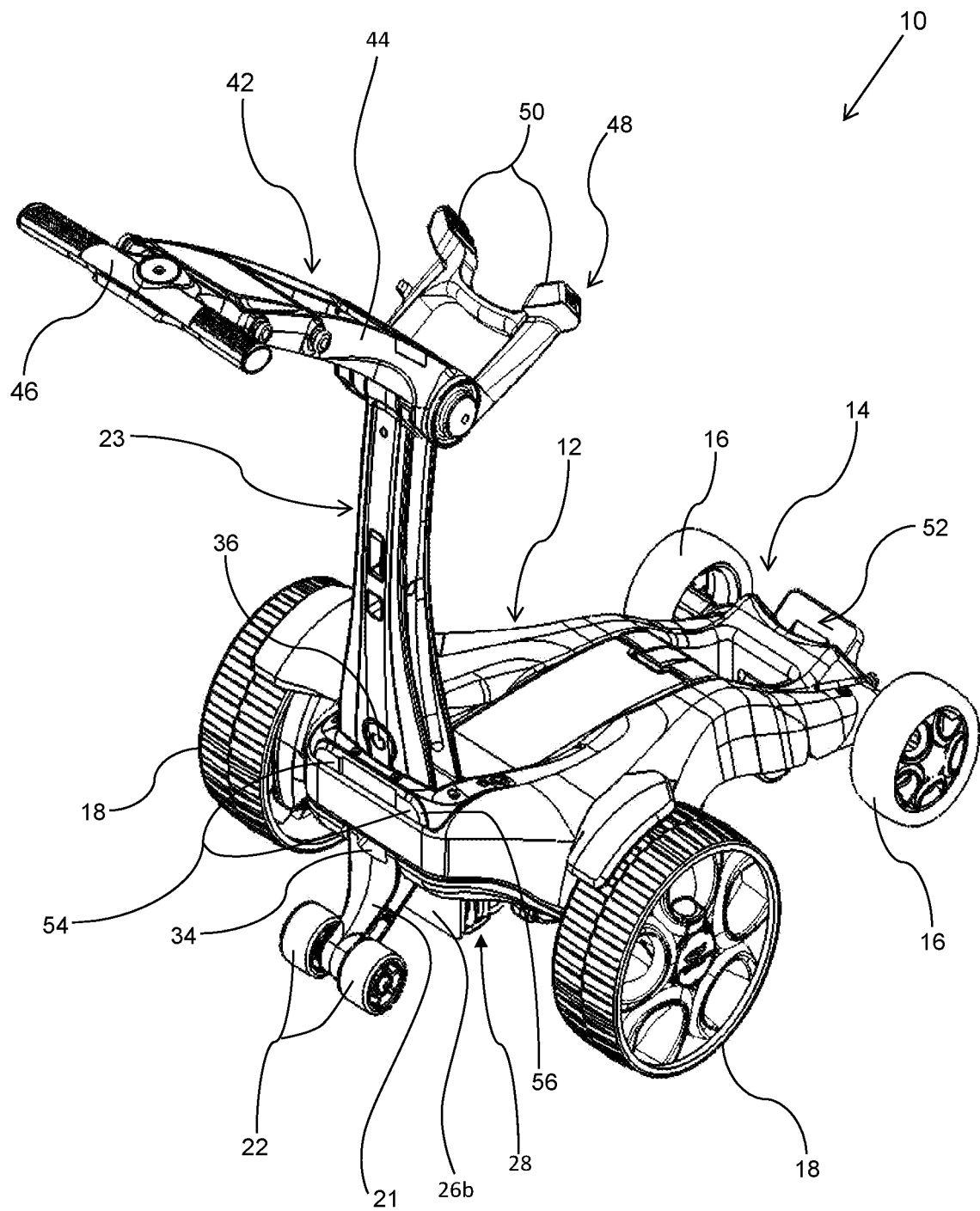
FIG. 1 shows a perspective view of the trolley in an operative configuration.
Figure 2:
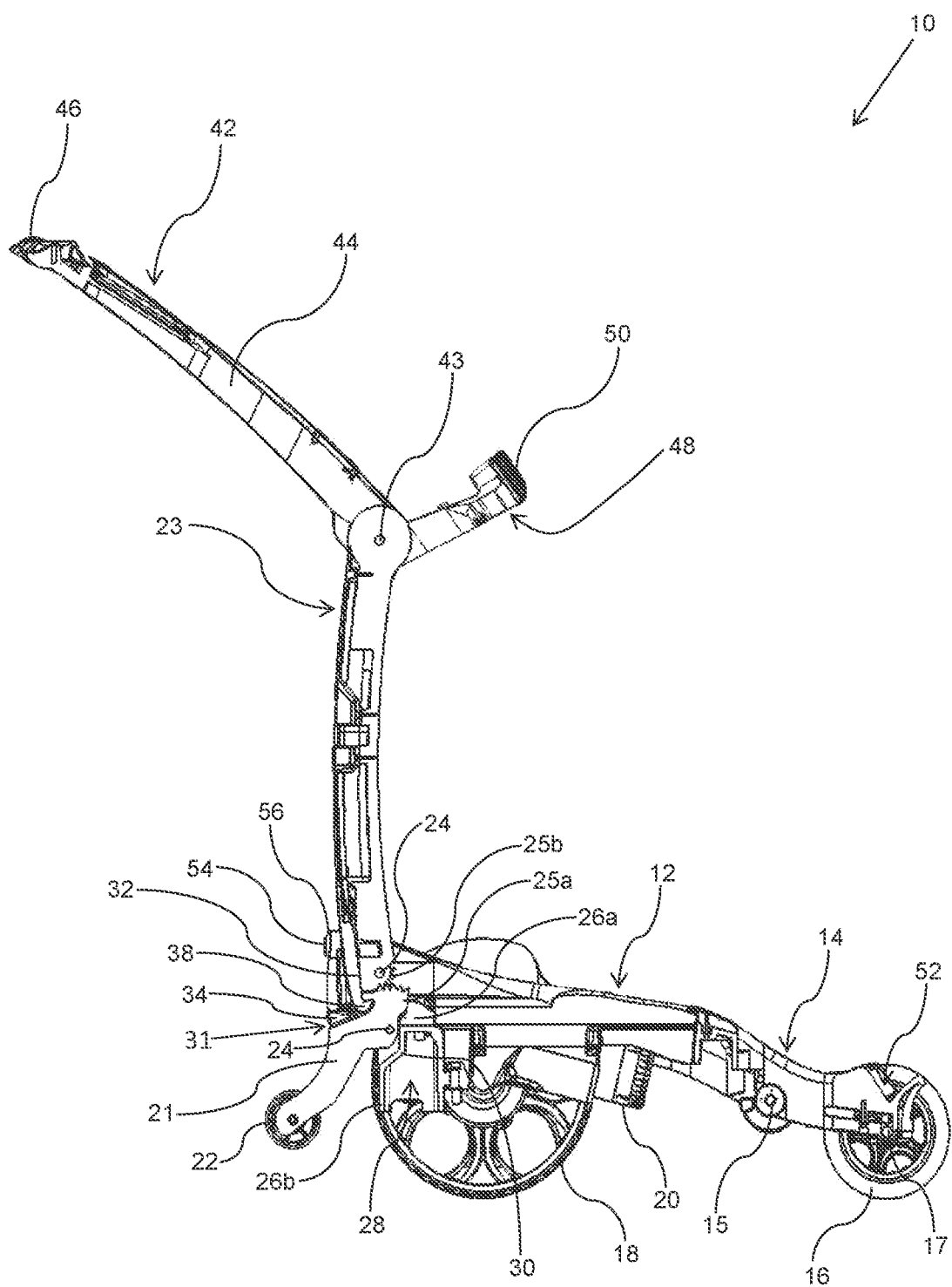
FIG. 2 shows a side view of the trolley of FIG. 1 in the operative configuration.
Figure 3:
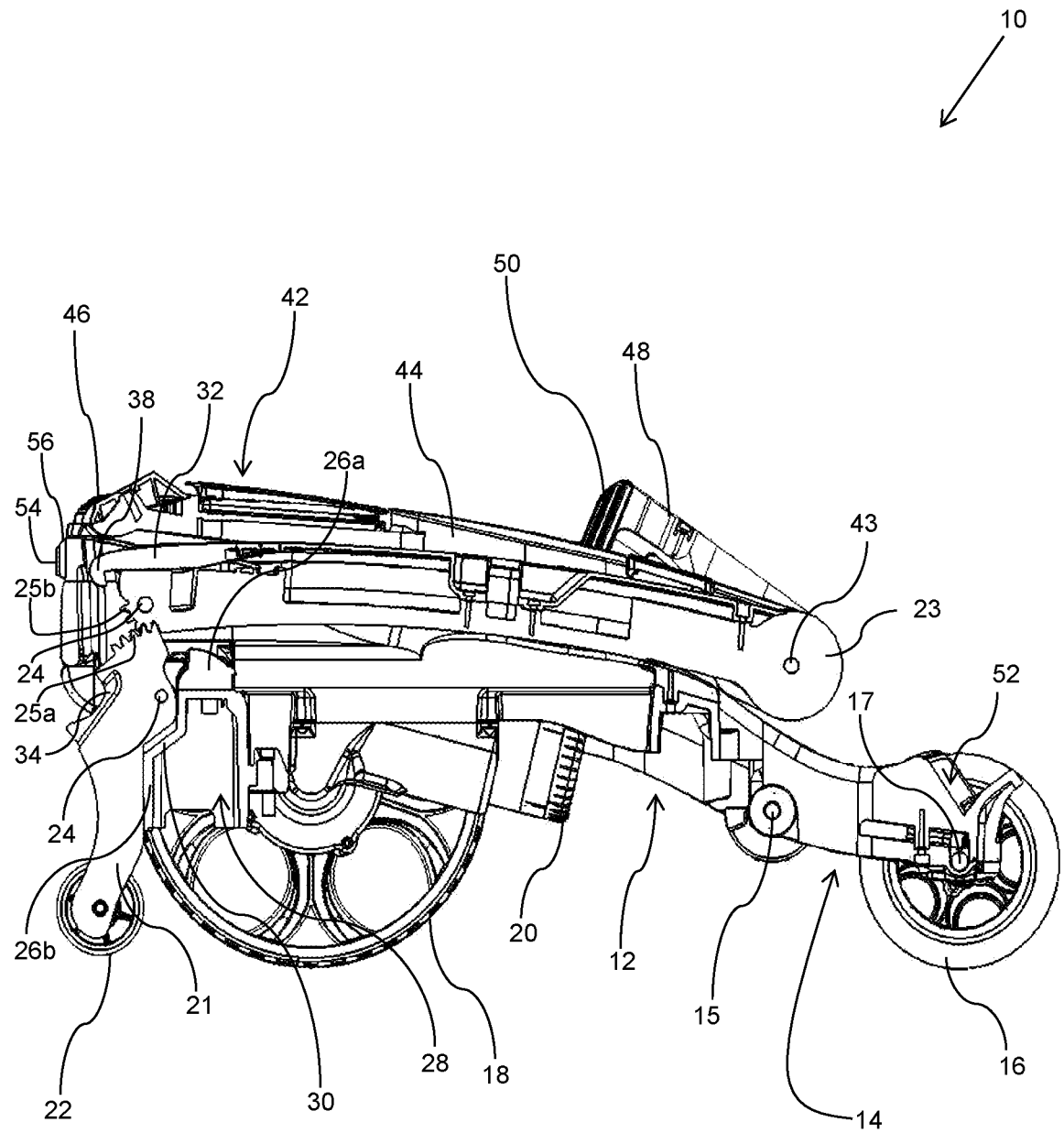
FIG. 3 shows a side view of the trolley of FIG. 1 in a partially folded configuration.
Figure 4:
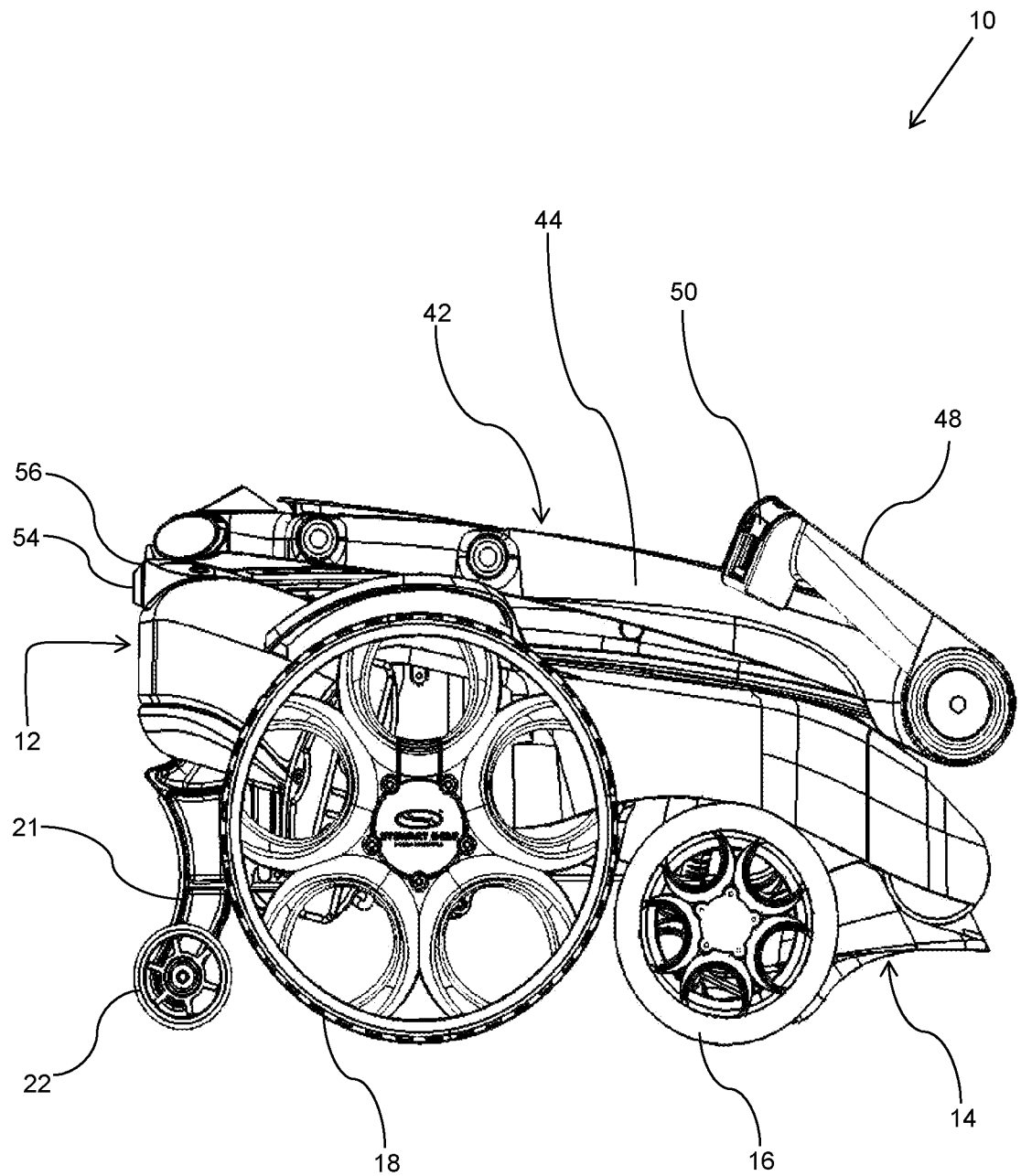
FIG. 4 shows a side view of the trolley of FIG. 1 in a fully folded configuration.
Figure 5:
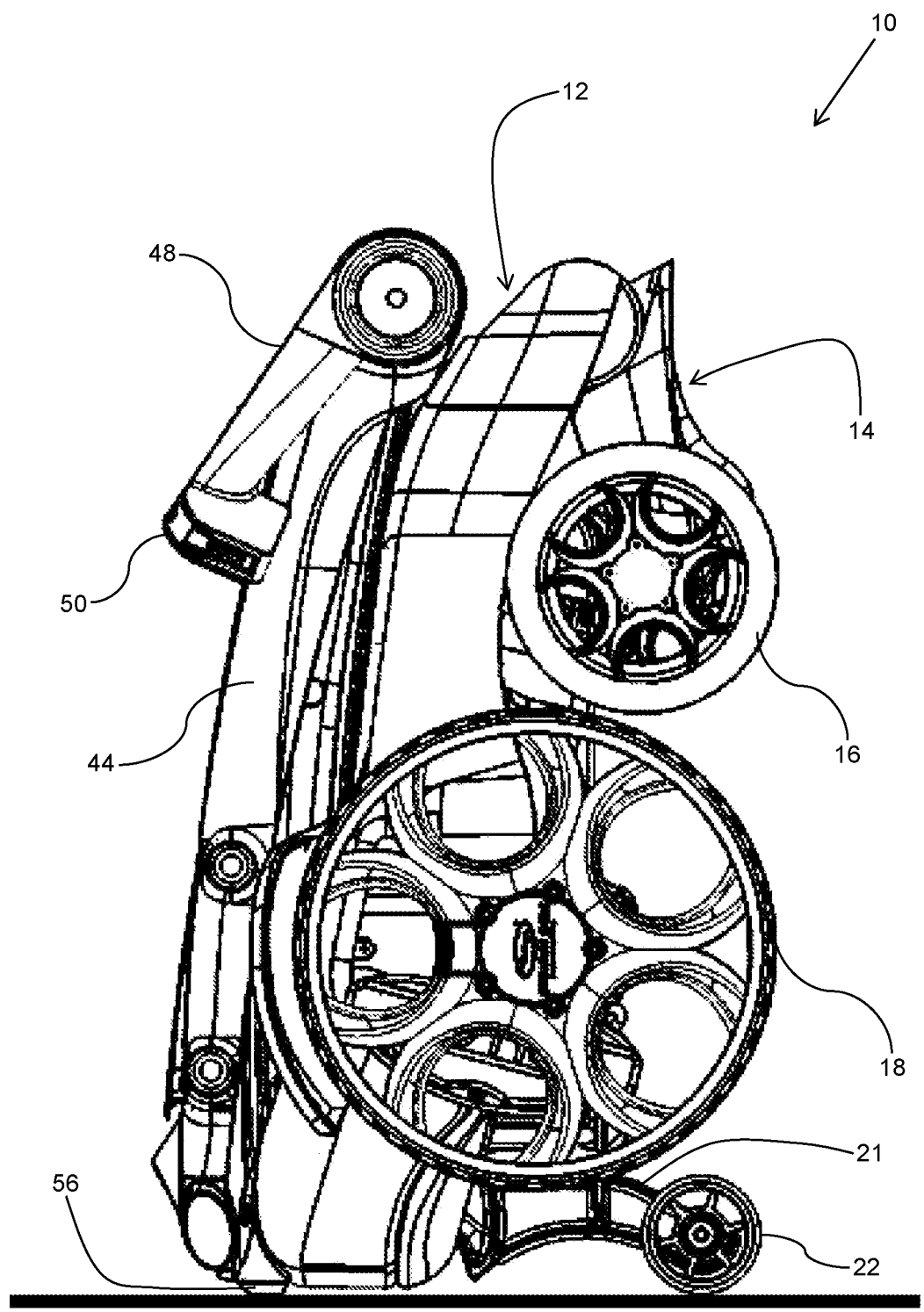
FIG. 5 shows a side view of the trolley of FIG. 1 in a fully folded configuration while in a substantially vertical storage position.

A foldable wheel support arm 14 is rotatably mounted about an axle 15, pivot point or similar, to the first end of the chassis 12. The foldable wheel support arm 14 is movable between an operative configuration and a folded configuration. FIGS. 1, 2 and 3 show the foldable wheel support arm 14 in the operative configuration in which it extends out from the chassis 12 in a substantially forward direction. FIGS. 4 and 5 show the foldable wheel support arm 14 in the folded configuration in which it is substantially within an area formed by the periphery of the underside of the chassis 12.

Front wheels 16 are coupled to the foldable wheel support arm 14 by an axle 17, pivot point or similar. In some embodiments, the front wheels 16, in the folded configuration, are disposed outside the area extending out from the periphery of the chassis 12. However, in other embodiments they may be within the area.

In the current embodiment, drive wheels 18 are disposed between the second end and center of the chassis 12. In other embodiments, the drive wheels 18 are disposed proximate the second end of the chassis 12. The drive wheels 18 are powered by an electric motor 20. A drive train (not shown) connects the wheels to the electric motor 20. The drive wheels 18 have a diameter which is larger than the front wheels 16. In other embodiments, the diameter of the drive wheels may be the same.

When the wheel support arm 14 is in the folded configuration, as shown in FIG. 4, the front wheels 16 and the drive wheels 18 are substantially on the same plane. That is to say, the plane is defined by tangents of both the front wheels 16 and drive wheels 18.

A stabilizer arm 21 with a set of stabilizer wheels 22 disposed thereon is provided to stop the foldable golf trolley 10 from entirely tipping over should the foldable golf trolley 10 start tipping backwards.

A main support 23 is provided to support the golf bag when the foldable golf trolley 10 is being used. It also provides a means to support the golf bag in a convenient position for the user of the trolley.

The stabilizer arm 21 and the main support 23 are each rotatably mounted, by means of axles 24, pivot points or similar, to the second end of the chassis 12. The stabilizer arm 21 and main support 23 rotate from an operative configuration to a folded configuration. FIGS. 1 and 2 show the stabilizer arm 21 and main support 23 in the operative configuration. FIGS. 3, 4 and 5 show the stabilizer arm 21 and main support 23 in the folded configuration.

The stabilizer arm 21 includes a body portion and a leg portion extending from the body portion in a curved manner. In the operative configuration, at least the leg portion extends from the underside of the chassis 12 in a downward and rear direction. The body portion and curved leg portion form a substantially doglegged shaped cross section. The doglegged shape allows the stabilizer wheels 22 to be disposed outside the area formed by the periphery of the underside of the chassis 12 such that prior to tipping the stabilizer wheels 22 are not usually in contact with the surface on which the trolley 10 is operating, unless it is particularly uneven. The stabilizer wheels 22 are substantially above a plane extending between the ground contact positions of the front wheels 16 and drive wheels 18.

A shown in FIGS. 3 and 4, when the stabilizer arm 21 is in the folded configuration, the stabilizer wheels 22, front wheels 16 and drive wheels 18 are substantially on the same plane. That is to say, the plane is defined by tangents of each of the stabilizer wheels 22, front wheels 16 and drive wheels 18.

Gears 25a, 25b are provided to couple movement of the main support 23 to the stabilizer arm 21. The gears 25a, 25b cause the automatic deployment or retraction of the stabilizer arm 21 when the main support 23 is moved between folded and operative configurations.

In the current embodiment, the gears 25a, 25b are integrally formed in both the stabilizer arm 21 and main support 23. A first set of gear teeth 25a are formed on or in the surface of the body portion of the stabilizer arm 21 and a second set of gear teeth 25b are formed on or in a portion of the main support 23.

A means to limit the rotation of the stabilizer arm 21 is provided on or in the chassis 12. The means comprises a first stop 26a for limiting rotation in one direction and a second stop 26b for limiting rotation in the other direction.

The first stop 26a effectively sets the position of the stabilizer arm 21 and stabilizer wheels 22 in the operative configuration. Consequently, the position of the main support 23, in the operative configuration, is at least partially set because the gears 25a, 25b couple the movement.

The first stop 26a comprises a face for abutting a face of the body portion of the stabilizer arm when in the operative configuration. In the current embodiment, the profile of the body portion's face includes an overhang which provides for the necessary positioning and number of gear teeth.

The second stop 26b effectively sets the position of the stabilizer arm 21 and stabilizer wheels 22 in the folded configuration. Consequently, the position of the main support 23, in the folded configuration, is at least partially set because the gears 25a, 25b couple the movement.

A box section 28 is provided on the underside of the chassis 12. The box section 28 is formed from a base and walls extending downwardly from the base. At least a portion of a first wall 30 forms the second stop 26b. The portion providing the second stop 26b is offset from the base. A portion of the stabilizer arm 21, in the folded configuration, abuts the portion of the first wall 30.

The first stop 26a and second stop 26b also help prevent the gears 25a, 25b from unmeshing.

The box section 28 may be used as a housing for electronics to control the foldable golf trolley 10. A control system may control the operation of the motor 20. The control system may control the direction of movement of the foldable golf trolley 10 by controlling the speed of rotation or direction of rotation of each of the drive wheels 18. The control system may receive instructions from a remote control or similar remote system.

A battery may be provided to supply power to the foldable golf trolley 10. In some embodiments, the battery may be disposed in or on the chassis 12 of the foldable golf trolley.

Sensors may also be provided which provides data to the control system. The control system may automatically follow a user at a predetermined distance. The control system may determine the direction and distance to the user through the sensor data.

A latch, indicated generally at 31, is provided to releasably secure both the main support 23 and stabilizer arm 21 in their operative position. The latch 31 includes a rocker arm 32 disposed on or in the main support 23 and a receiving means 34 disposed in the stabilizer arm 21 to receive a portion of the rocker arm. The receiving means 34 is an undercut, or similar, provided in the body portion of the stabilizer arm 21.

A user operated tab 36 is disposed at one end of the rocker arm 32 and a hook 38 for engaging with the receiving means 34. The hook being disposed at the end opposite the user operator tab 36. A biasing means (not shown) is provided to bias the rocker arm 32 into an engagement position. The hook 38 comprises a cam surface and an engagement surface.

A handle 42 is rotatably mounted by means of an axle, pivot point, or similar 43, to the main support 23. The handle includes a main body 44 extending from operator elements 46 to the main support 23. The operator elements 46 provide control means for controlling the operation of the electrical system, such as the electric motor 20.

The handle 42 is rotatable between an operative configuration and a folded configuration. FIGS. 1 and 2 show the handle 42 in the operative configuration, in which it extends out from the main support 23 in a substantially rearward direction away from the chassis 12. FIGS. 3, 4 and 5 show the handle 42 in the folded configuration, in which extends substantially along the main support 23 from its mounting point. The handle 42 is sized and shaped to fit within an area extending out from the periphery of the upper side of the chassis 12.

The handle 42 may be used by the user to move the main support 23 from the operative configuration to the folded configuration, when the latch 31 has been disengaged. The user pushes the handle 42, or applies a force, towards the front of the foldable golf trolley 10 or foldable wheel support 14. This force causes the main support 23 to rotate about its axle, pivot or similar 24. Once the main support 23 has reached its folded position the user applies a downward force to move the handle to its final folded position in which it rests substantially along the length of the main support 23. Reverse step, i.e., applying an upward force and then applying a force to the rear of the trolley, may be applied to move the main support 23 from the folded configuration to the operative configuration.

A golf bag support arm 48 is rotatably mounted to the main support 23 about axle 43. The golf bag support arm 48 comprises two elements 50, each element having a concave face. Both the distance between the two elements 50 and the curvature of the concave face are shaped and sized to receive a golf bag and provide support.

The golf bag support arm 48 is rotatable between an operative configuration and a folded configuration. FIGS. 1 and 2 show the golf bag support arm 48 in the operative configuration in which it extends out from the main support 23 substantially forwardly. FIGS. 3, 4 and 5 show the golf bag support arm 48 in the folded configuration in which it rests against the handle 42. The golf bag support arm 48 being sized and shaped to fit within the area defined by the periphery of upper side of the chassis 12.

A golf bag support foot 52 for supporting the lower end of a golf bag is provided on the foldable wheel support arm 14. The golf bag support foot 52 comprises a support protrusion extending from the foldable wheel support arm and a concave surface. The golf bag support foot 52 being angled so that it can support the lower end of the golf bag while the golf bag support arm 48 supports the middle to upper region of the golf bag.

A user may apply a force to the golf bag support arm 48 to cause it to rotate between the operative configuration shown in FIGS. 1 and 2, and the folded configuration shown in FIGS. 3 to 5. In an alternative embodiment, the axle, pivot or similar 43, may be provided with a means to cause the golf bag support arm 48 to automatically rotate between the operative configuration and the folded configuration. The means may be provided by sections of the main support 23 interfacing with sections of the golf bag support arm 48 within housing of the axle, pivot or similar 43, when the main support has rotated by a predetermined amount.

A trolley storage stand is provided to allow the trolley to be stored stably in a vertical position while in a folded configuration, as shown in FIG. 5. The trolley storage stand is provided by raised surfaces 54 on the second end of the chassis 12 and the stabilizer wheels 22.

When the stabilizer arm 21 is in the folded configuration, the raised surface 54 and edge of the stabilizer wheels are flush, that is to say, the periphery of the wheel sits on the same plane as the raised surface 54.

The raised surface 54 is disposed on a trolley stand element 56 which is disposed on the chassis 12. Two spaced apart feet are provided on the stand element, the faces of which form the raised surface.

While certain representative embodiments and details have been shown for purposes of illustrating the invention, it will be apparent to those skilled in the art that various changes can be made without departing from the scope of the disclosure, which is further described in the following appended claims.

What is claimed is:
1. A foldable golf trolley comprising:
a chassis including a front and a rear end;
at least one electrically powered rear drive wheel;
a wheel support arm mounted to the front of the chassis supporting a front wheel;
a stabilizer arm mounted to the rear end of the chassis supporting a stabilizer wheel;
a main support mounted to the chassis and a handle mounted to the main support;
wherein the main support, the wheel support arm and the stabilizer arm are rotatably mounted to the chassis and movable between an operative configuration and a folded configuration; and
gears connecting the stabilizer arm and main support, wherein rotation of the main support between the operative configuration and the folded configuration causes rotation of the stabilizer arm between the operative configuration and the folded configuration; wherein the stabiliser wheel is disposed behind the rear drive wheel when the stabiliser arm is in each of the operative configuration and the folded configuration.

2. The foldable golf trolley of claim 1, wherein the main support, the wheel support arm and the stabilizer arm are rotatably mounted to the chassis and rotatable between the operative configuration and the folded configuration.

3. The foldable golf trolley of claim 2, wherein the main support and stabilizer arm counter rotate in a first direction towards the front of the chassis when moved from the operative configuration to the folded configuration, and in which the main support and stabiliser arm counter rotate in a second direction away from the front of the chassis when moved from the folded configuration to the operative configuration.

4. The foldable golf trolley of claim 1, wherein the gears are integrally formed with the stabilizer arm and the main support.

5. The foldable golf trolley of claim 1, wherein the stabilizer arm is doglegged in shape, wherein in the operative configuration the stabilizer wheel is disposed outside an area formed by a periphery of the chassis and in the folded configuration the stabilizer wheel is disposed within the area formed by the periphery of the chassis.

6. The foldable golf trolley of claim 1, wherein the chassis comprises a first stop and a second stop limiting rotation of the stabilizer arm, the first stop defining a position of the stabilizer arm in the operative configuration and the second stop defining a position of the stabilizer arm in the folded configuration.

7. The foldable golf trolley of claim 1, wherein the foldable golf trolley comprises a stand disposed on the rear end of the chassis, the stand being formed by a portion of the chassis and the stabilizer wheel when the stabilizer arm is in a folded configuration.

8. The foldable golf trolley of claim 1, wherein the handle is rotatably mounted to an end of the main support distal to the chassis.

9. The foldable golf trolley of claim 1, wherein movement of the handle between operative and folded configurations causes movement of the main support between the operative and folded configurations.

10. The foldable golf trolley of claim 1, wherein the foldable golf trolley comprises a golf bag support arm rotatably mounted to the main support.

11. The foldable golf trolley of claim 10, wherein the golf bag support arm is rotatably moveable between an operative configuration in which it extends out from the main support and a folded configuration in which it is adjacent to the handle.

12. The foldable golf trolley of claim 11, wherein movement of the handle between the operative and folded configurations causes movement of the golf bag stand arm between the operative and folded configurations.

13. The foldable golf trolley of claim 1, wherein the foldable golf trolley comprises a latch for releasably securing both the stabilizer arm and the main support in their operative configuration.

14. The foldable golf trolley of claim 13, wherein the latch comprises a rocker arm disposed on or in the main support, a hook disposed on one end of the rocker arm and a receiving means formed in the stabilizer arm for receiving the hook when the stabilizer arm and the main support are in their operative configuration.

15. The foldable golf trolley of claim 1, wherein the front wheel and the rear drive wheel sit on the same plane in a first arrangement when the wheel support arm is in the folded configuration, and the front wheel and the rear drive wheel sit on that same plane in a different second arrangement when the wheel support arm is in the operative configuration.

16. The foldable golf trolley of claim 1, wherein the front wheel, the rear drive wheel and the stabilizer wheel sit on the same plane when the stabilizer arm is in the folded configuration, and in which the front wheel and the rear drive wheel sit on that same plane whilst the stabiliser wheel sits above that same plane when the stabiliser arm is in the operative configuration.

17. The foldable golf trolley as claimed in claim 1, in which the front wheel is disposed in a first position ahead of the front of the chassis when the wheel support arm is in the operative configuration, and the front wheel is disposed in a second position behind the front of the chassis and ahead of the rear drive wheel when the wheel support arm is in the folded configuration.

18. The foldable golf trolley as claimed in claim 17, in which the front wheel in the second position behind the front of the chassis is disposed ahead of the stabiliser wheel.

19. The foldable golf trolley as claimed in claim 1, in which the wheel support arm is movable independently of the main support arm and the stabiliser arm.

* * * * *